United States Patent Office 3,133,914
Patented May 19, 1964

3,133,914
SPIRO-OXIRANES OF THE PREGNANE SERIES AND METHODS FOR THE MANUFACTURE THEREOF
Elliot L. Shapiro, Cedar Grove, and Eugene P. Oliveto, Glen Ridge, N.J., assignors to Schering Corporation, Bloomfield, N.J., a corporation of New Jersey
No Drawing. Filed Apr. 9, 1962, Ser. No. 185,867
7 Claims. (Cl. 260—239.55)

This invention relates to a new class of steriod compounds and to processes for their manufacture. More particularly, this invention relates to valuable steroid compounds of the 3-keto pregnane series which are substituted at the 16-position by a group, which with carbon atom 16, forms a spiro-oxirane ring.

In its broad aspect, this invention relates to compounds of the 3-keto pregnane series having a D-ring substituted as shown in the following structural formula:

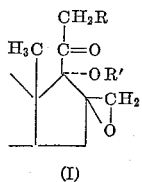

(I)

In the foregoing formula, R represents any conventional 21-substituent such as H, halogen, hydroxy, and esters of the hydroxy group with organic carboxylic acids having up to 8 carbon atoms and inorganic acids such as phosphoric. R' represents H or lower alkanoyl.

Our invention contemplates both of the epimeric oxiranes. When the C–16 bond to the oxirane methylene is $\beta$, then the C–16 bond to the oxygen is $\alpha$, and vice versa. The configuration appears to be somewhat dependent on the method of synthesis. The usual synthetic methods result in the bond to the oxygen being in the $\alpha$-position and the methylene group being attached to C–16 in the $\beta$-position. Under certain, later described, conditions the reverse may be obtained.

In the foregoing, the term 3-keto pregnane series is meant to include saturated and nuclearly unsaturated members of the class such as represented by 17$\alpha$-acetoxy progesterone, cortisone, prednisone, prednisolone, 6$\alpha$-methylprednisolone, hydrocortisone, allodihydrocortisone and the like, and esters thereof. As indicated, these pregnanes may be substituted at various positions. For example, an oxygen function may be present at positions 11 and/or 21 in the form of hydroxyl, ester or keto at the 11-position. Halogen may be present at positions 6, 9, 11 and 21 and methyl groups may be present at the 6-position. Some of these structures are transformable into those which are therapeutically effective. For example, an 11-hydroxy group may be oxidized to keto, a nuclear saturated structure may be dehydrogenated and a 21-halo group may be converted to acyloxy, hydroxy or hydrogen. It is thus an object of our invention to provide steroid compounds of the pregnane series which have a substituted D-ring as shown above and which are either therapeutically active, as indicated, per se, or are convertible into such therapeutically active substances.

In its more limtied aspect, this invention relates to compounds having the formula:

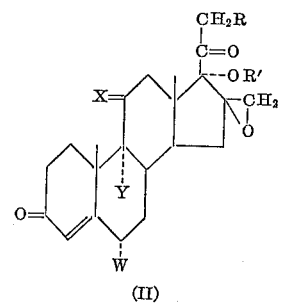

(II)

including the $\Delta^1$-dehydro, the $\Delta^6$-dehydro and the $\Delta^{1,6}$-bisdehydro analogs, wherein W is a member of the group consisting of H, methyl and halogen (preferably F), R is a member of the group consisting of H, OH and esters thereof, the esters being of lower alkanoic acids and dibasic organic acids having up to 8 carbon atoms and phosphoric acid, R' is a member of the group consisting of H and lower alkanoyl, X is a member of the group consisting of $H_2$, O, (H, $\beta$ halogen) and (H, OR') and Y is a member of the group consisting of H and halogen, with the limitation that when X is $H_2$ or (H, $\alpha$OR'), then Y is hydrogen and when X is (H, $\beta$ halogen), then Y is halogen.

Also embraced within our invention are additional valuable intermediates such as for example, those wherein X and Y taken together represent either a double bond or an epoxy group, those wherein the substituent C–11 is $\alpha$-hydroxyl. Compounds possessing these groups are convertible into the particular therapeutically effective ones by methods well-known in the art.

The novel spiro-oxirane compounds of this invention are generally preparable by epoxidation of the 16-methylene precursor according to the following reaction scheme:

(A)  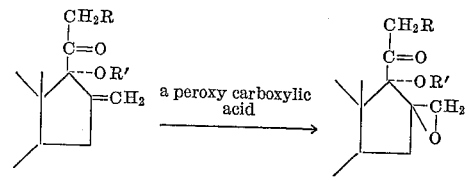

In scheme A, R and R' have the same significance as set forth heretofore. When R' is a small group such as hydrogen or acetyl it is believed that the produced spirooxirane is $\alpha,\beta$; that is, the oxygen is joined to C–16 in the $\alpha$-configuration while the methylene group is joined in the $\beta$-configuration. When large blocking groups capable of exerting a marked steric effect are present on the sidechain, such a bismethylene dioxy group or a large ester at C–17, then it is believed that a $\beta,\alpha$-spiro-oxirane is produced, i.e., the oxygen is joined to C–16 in the $\beta$-configuration and the methylene in the $\alpha$-configuration.

An alternate method for preparing the $\beta,\alpha$-spiro-oxirane (oxygen in $\beta$-configuration) is that whereby the 16-methylene pregnane compound, bearing an α-acyloxy group at 17-position, or a bismethylene dioxy protective group on the dihydroxy acetone side chain is reacted with hypohalous acid (preferably hypobromous) whereby there is produced the 16α-bromomethyl-16β-hydroxy analog. This latter substance upon reaction with mild base is converted to the β,α-spiro-oxirane.

The peroxidation is carried out in a non-reactive organic solvent. By "non-reactive" is meant one which is inert to the action of the reactants under the conditions of the reaction such as ethyl acetate, ether, halogenated hydrocarbons (preferably methylene chloride) and the like. The term "non-reactive" inherently excludes non-anhydrous solvents. The 16-methylene steroid and the peroxy acid are dissolved in the solvent and maintained in such states for up to 48 hours at a temperature preferably below, but which may be at, room temperature. Excess peroxy acid is removed by extraction with mild base such as sodium carbonate and the spiro-oxirane obtained by evaporation of the organic phase and crystallization of the residue. In some cases, chromatographic techniques are helpful to purify the product.

The peroxy acid is preferably of the perbenzoic class such as the peracids of benzoic, phthalic, o-, m-, or p-chlorobenzoic acid. We prefer m-chloroperbenzoic acid because of its ready availability, ease of handling and stability. Quite naturally, the 16-methylene steroid must itself not possess groups (other than the 16-methylene) which will react with the peroxy acid under the conditions of the reaction at a rate which will be competitive with the desired epoxidation. If such reactive groups are present, it is preferred to protectively block them prior to epoxidation. For example, a $\Delta^{9,(11)}$-unsaturation may be protected by first forming a 9α,11β-dihalogeno intermediate, epoxidizing the 16-methylene group and then regenerating the $\Delta^{9,(11)}$-bond with zinc in acetic acid. Additionally, if the starting material contains a hydroxyl group at C–21, we prefer to first esterify with a lower alkanoic acid and then epoxidize the 16-methylene group of the 21-ester. The ester can be saponified without effect upon the spiro-oxirane function to yield the corresponding 21-hydroxy substance. This then can be esterified according to the usual techniques well known in the art.

The starting materials for the reaction described above, i.e., 16-methylene compounds of the 3-keto pregnane series are either known in the art such as Taub et al., J. Org. Chem. 25: 2258 (1960) or prepared by methods described in our copending application Serial No. 861,208, filed December 22, 1959.

In this specification and claims standard nomenclature is employed for naming the spiro-oxiranes. For example, the oxirane of cortisone wherein the oxygen of the oxirane is attached to C–16 in the α-configuration is named as spiro-(cortisone-16,2'-α-oxirane) or spiro-(17α,21-dihydroxy-3,-11,20-diketo-4-pregnene 16,2'-α-oxirane). In such nomenclature, the steroid moiety is first described, then the carbon atom of the steroid and that of the oxirane which are identical to each other is identified by the appropriate position number (the numbers bearing the prime pertaining to the oxirane ring) and finally the configuration of the oxygen of the oxirane about C–16 is set forth.

As indicated heretofore, our invention embraces all compounds of the 3-keto pregnane series having a substituted D-ring as shown in Formula I. Those compounds which are not therapeutically valuable per se are convertible into such valuable substances by transformations well known in the art. Sprio-oxirane analogs of physiologically active substances are themselves physiologically active. Compounds of the pregnane series which are normally useful merely as chemical intermediates will also be chemical intermediates in the form of their spiro-oxiranes. Thus, the known reactions for transforming such intermediates to physiologically active substances such as progestins and corticoids are equally applicable in transforming the oxirane intermediates.

In general, the spiro-oxiranes having generic Formula II are physiologically active. Those compounds possessing an 11-keto or 11β-hydroxy substituent together with a 20-keto 17α,21-dihydroxy side chain (or ester thereof) are useful anti-inflammatory agents. Included in such a class of corticoid-like substances are the 9,11-dihalogeno analogs. Those compounds having the aforedescribed side-chain but devoid of oxygen at C-11 or possessing an 11α-hydroxy group are useful intermediates. For example, an 11α-hydroxyl group may be oxidized to keto according to standard techniques or the 11-position may be hydroxylated by any of the vast number of microorganisms known to effect 11-hydroxylation.

Those compounds of the general Formula II which are devoid of oxygen at both C–11 and C–21 are valuable progestins useful, for example, as progestational and anti-fertility agents. Those compounds devoid of oxygen only at C–21 are also anti-inflammatory in their action.

The compounds of this invention, including those of general Formula II are useful building blocks in organic synthesis. The oxirane moiety may be reacted with agents such as boron trifluoride, hydrogen halide, magnesium halide, dimethyl sulfoxide and the like whereby the oxirane ring is ruptured giving rise to new classes of chemical substances.

The following examples are representative of methods of preparing the various tangible embodiments of our novel concept.

EXAMPLE 1

*Spiro-(17α-Hydroxy-21-Acetoxy-3,11,20-Triketo-1,4-Pregnadiene-16,2'-α-Oxirane)*

Cool a solution of 0.1 g. of 16-methylene prednisone 21-acetate in 10 ml. of methylene chloride to about 6° C. and add 0.5 g. of m-chloroperbenzoic acid. Maintain at 6° C. for 48 hours and dilute with methylene chloride. Extract the reaction mixture with 10% sodium carbonate solution and then with water. Concentrate the organic layer to dryness and recrystallize the residue from acetone. Yield: 67 mg., M.P. 214–219° C. $\lambda_{max.}$ 238 m$\mu$ (E=15,500), $\lambda_{max.}$ (Nujol) 2.98, 5.75, 5.85, 6.01, 6.15, 6.25, 11.22$\mu$.

Saponification of the 21-acetate with mild base according to standard techniques yields the corresponding 21-ol. This may be esterified with a lower alkanoic acid such as propionic, butyric, caproic or a dibasic acid such as succinic, sulfobenzoic, phthalic or phosphoric to yield the analogous 21-ester or hemi ester. The hemi esters may be converted to their respective alkali metal salts so as to form a soluble preparation.

In the following table are listed compounds obtained by subjecting the 16-methylene analog of the steroid mentioned in the table to the reaction as described in this example.

Spiro-16,2'-α-oxirane of:
    9α-fluoro-prednisolone 21-acetate
    Prednisolone 21-acetate
    1-dehydro-17α-acetoxyprogesterone
    17α-acetoxyprogesterone
    6α-fluoro-prednisolone 21-acetate
    6α-methylprednisolone 21-acetate
    4-pregnene-17α,21-diol-3,20-dione 21-acetate
    1,4-pregnadiene-17α,21-diol-3,20-dione 21-acetate
    6α-methyl-17α-acetoxyprogesterone The ester grouping mentioned above may be removed by usual techniques whereby the free alcohol is obtained. Reesterification according to standard techniques may then be effected to prepare any desired or selected ester.

EXAMPLE 2

*Spiro-(11β,17α,21-Trihydroxy-3,20-Diketo-1,4-Pregnadiene 16,2'-β-Oxirane)*

Subject the bis-methylenedioxy derivative of prednisolone to the reaction and conditions set forth in Example 1. Instead of evaporating the solution to dryness after removal of the excess per-acid, chromatograph the solution on silica gel. Elute with hexane-benzene and ether-benzene mixed solvents starting with hexane and ending with ether. There are obtained two major products. Hydrolyze each separately with dilute acetic acid; dilute with water, extract with methylene chloride. Wash the methylene chloride with dilute sodium carbonate solution and then with water. Evaporate each to dryness and crystallize each from acetone. Compare melting points with the product obtained by the hydrolysis of the α-oxirane of prednisolone 21-acetate (spiro (prednisolone-16,2'-α-oxirane)) as well as infra-red characteristics and rotation. One of the products is the α-oxirane and the other is the β-oxirane of this example.

In similar manner β-oxiranes are prepared of: prednisone, cortisone, hydrocortisone, 6α-methylprednisolone, 16α-fluoroprednisolone, 9α-fluoroprednisolone. These are esterifiable as described heretofore to yield the corresponding 21-esters.

We claim:

1. A compound of the group consisting of pregnanes of the formula:

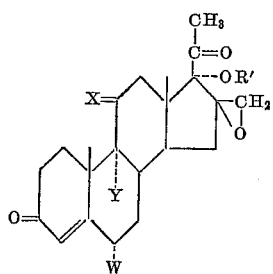

and the Δ¹-dehydro analogs thereof, wherein R' is a member of the group consisting of H and lower alkanoyl, X is a member of the group consisting of H₂, O, (and H, OH), Y is a member of the group consisting of H and halogen and W is a member of the group consisting of H, methyl and halogen.

2. A compound having the formula:

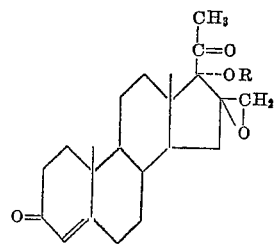

wherein R' is lower alkanoyl.

3. Spiro-(6α-methyl-17α-acetoxyprogesterone-16,2'-oxirane).
4. Spiro-(17α-acetoxyprogesterone-16,2'-oxirane).
5. In the process for preparing a spiro-oxirane of the pregnane series having a substituted D-ring of the formula:

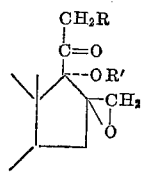

wherein R is a member of the group consisting of H and halogen and R' is a member of the group consisting of H and lower alkanoyl the step which comprises reacting a 16-methylene compound of the pregnane series having a substituted D-ring of the formula:

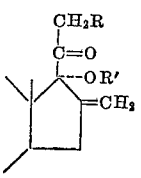

wherein R and R' are as herein defined with a member of the group consisting of peroxycarboxylic acid in an inert anhydrous organic solvent and a hypohalous acid.

6. The step in the process of claim 5, wherein the peroxy acid is a perbenzoic acid.
7. The step in the process of claim 5, wherein the hypohalous acid is hypobromous acid.

References Cited in the file of this patent

UNITED STATES PATENTS 3,068,224   Taub et al. _____ Dec. 11, 1962